(12) United States Patent
Moon et al.

(10) Patent No.: US 9,733,754 B2
(45) Date of Patent: Aug. 15, 2017

(54) MOBILE TERMINAL AND CONTROLLING METHOD THEREOF

(71) Applicant: LG ELECTRONICS INC., Seoul (KR)

(72) Inventors: Doohyun Moon, Seoul (KR); Jinho Son, Seoul (KR); Jihyun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

(21) Appl. No.: 14/834,893

(22) Filed: Aug. 25, 2015

(65) Prior Publication Data

US 2016/0062539 A1 Mar. 3, 2016

(30) Foreign Application Priority Data

Sep. 2, 2014 (KR) ........................ 10-2014-0116018

(51) Int. Cl.
*G06F 3/041* (2006.01)
*G06F 21/36* (2013.01)
(Continued)

(52) U.S. Cl.
CPC ........ *G06F 3/0416* (2013.01); *G06F 3/04883* (2013.01); *G06F 21/36* (2013.01);
(Continued)

(58) Field of Classification Search
CPC .... G06F 3/0416; G06F 3/0481; G06F 3/0482; G06F 3/04883; G06F 3/04886; G06F 21/31; G06F 21/36; G06F 21/74
See application file for complete search history.

(56) References Cited

U.S. PATENT DOCUMENTS 9,380,148 B2 * 6/2016 Tang ................... G06F 3/04883
2013/0055169 A1 * 2/2013 Wright .................... H04M 1/67
715/863
(Continued)

FOREIGN PATENT DOCUMENTS

KR 2011-0042634 4/2011
KR 2012-0067445 6/2012
(Continued)

OTHER PUBLICATIONS

International Search Report dated Dec. 10, 2015 issued in Application No. PCT/KR2015/008661.

*Primary Examiner* — Jennifer Mehmood
*Assistant Examiner* — Sardis F Azongha
(74) *Attorney, Agent, or Firm* — KED & Associates, LLP

(57) ABSTRACT

A mobile terminal and controlling method thereof are disclosed. The present disclosure includes a touchscreen configured to recognize at least one touch point at a same timing point and a controller, if a touch pattern for releasing a lock is received through the touchscreen, releasing a lock state of the touchscreen and outputting a preset screen. And, the touch pattern includes a preset touch pattern corresponding to the number of the at least one touch point recognized at the same timing point. Accordingly, a lock is released in response to a command for releasing a lock screen of a touchscreen, various informations are outputted, and a function is launched, simultaneously.

6 Claims, 21 Drawing Sheets

(51) Int. Cl.
*G06F 3/0488* (2013.01)
*G06F 21/74* (2013.01)

(52) U.S. Cl.
CPC .... *G06F 21/74* (2013.01); *G06F 2203/04104* (2013.01); *G06F 2203/04808* (2013.01); *G06F 2221/2147* (2013.01)

(56) References Cited

U.S. PATENT DOCUMENTS

2014/0109217 A1\* 4/2014 Park .................. G06F 21/44
 726/17
2014/0143859 A1\* 5/2014 Linge ................. G06F 21/36
 726/19

FOREIGN PATENT DOCUMENTS

| KR | 10-2012-0075714 | 7/2012 |
| KR | 10-2012-0108818 | 10/2012 |
| KR | 10-2013-0081910 | 7/2013 |
| KR | 2013-0079977 | 7/2013 |
| KR | 10-2013-0111777 | 10/2013 |
| KR | 10-2014-0044968 | 4/2014 |

\* cited by examiner

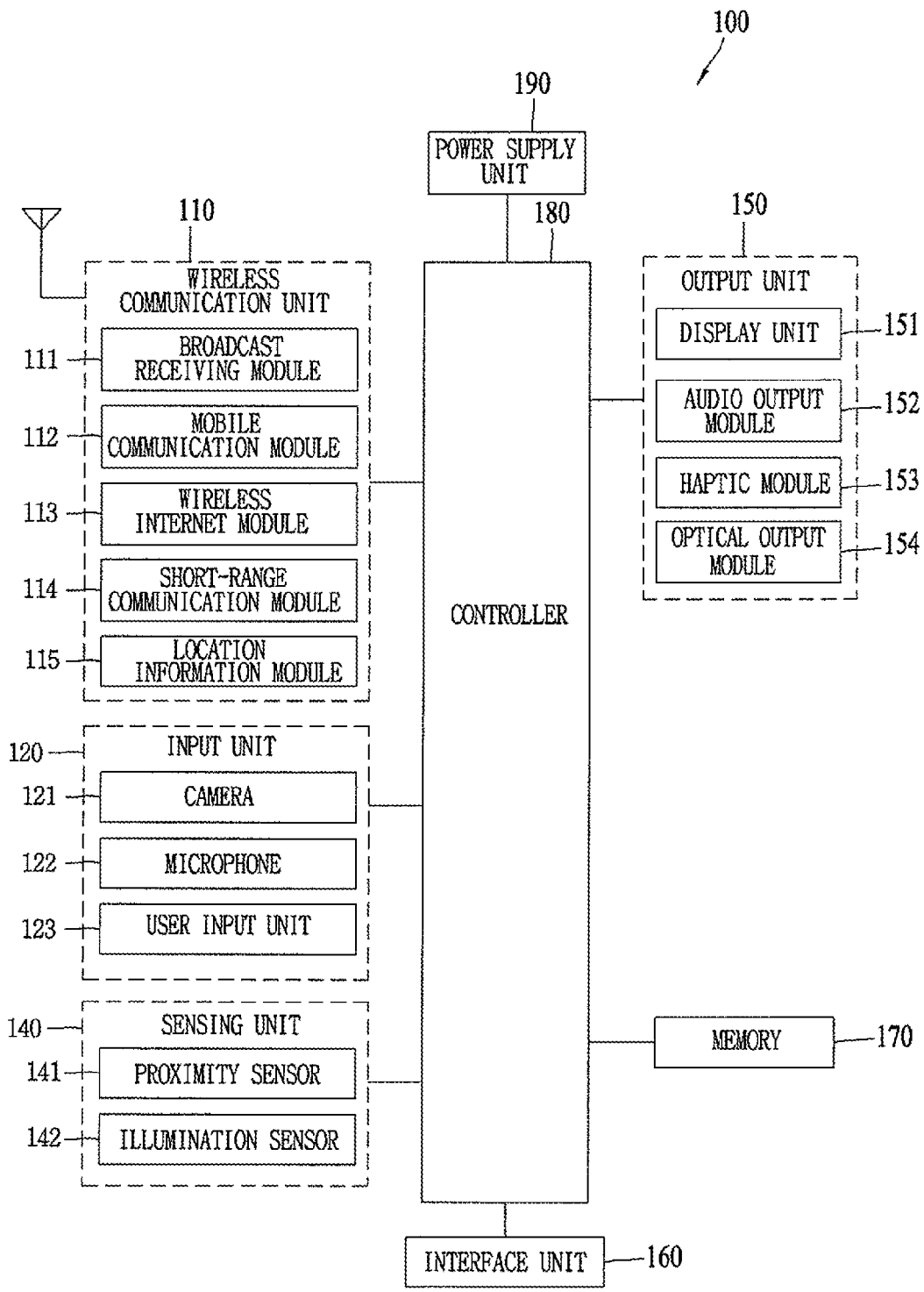

FIG. 7
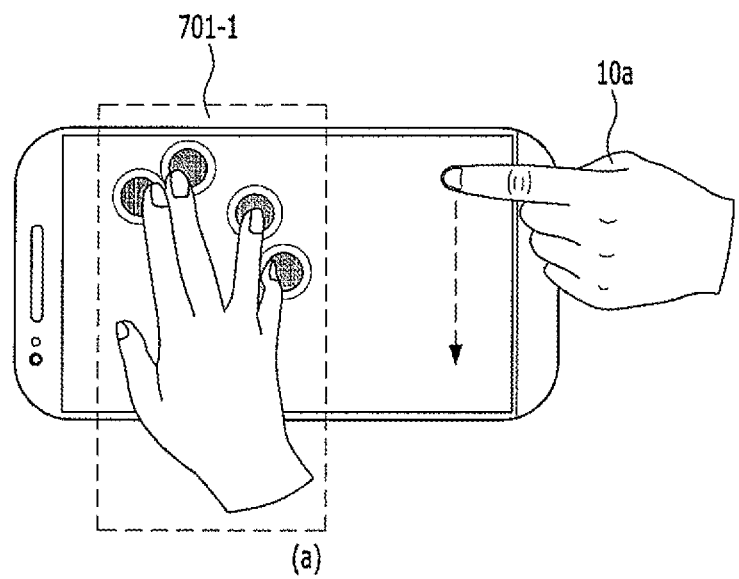
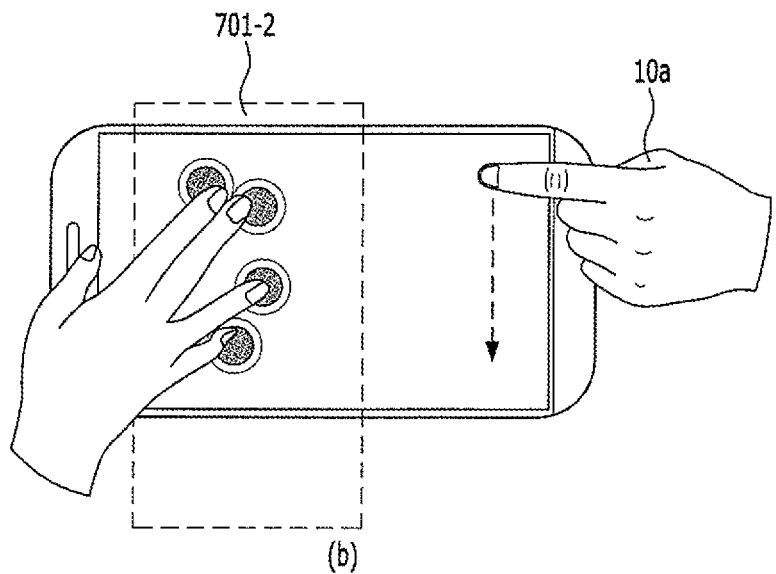

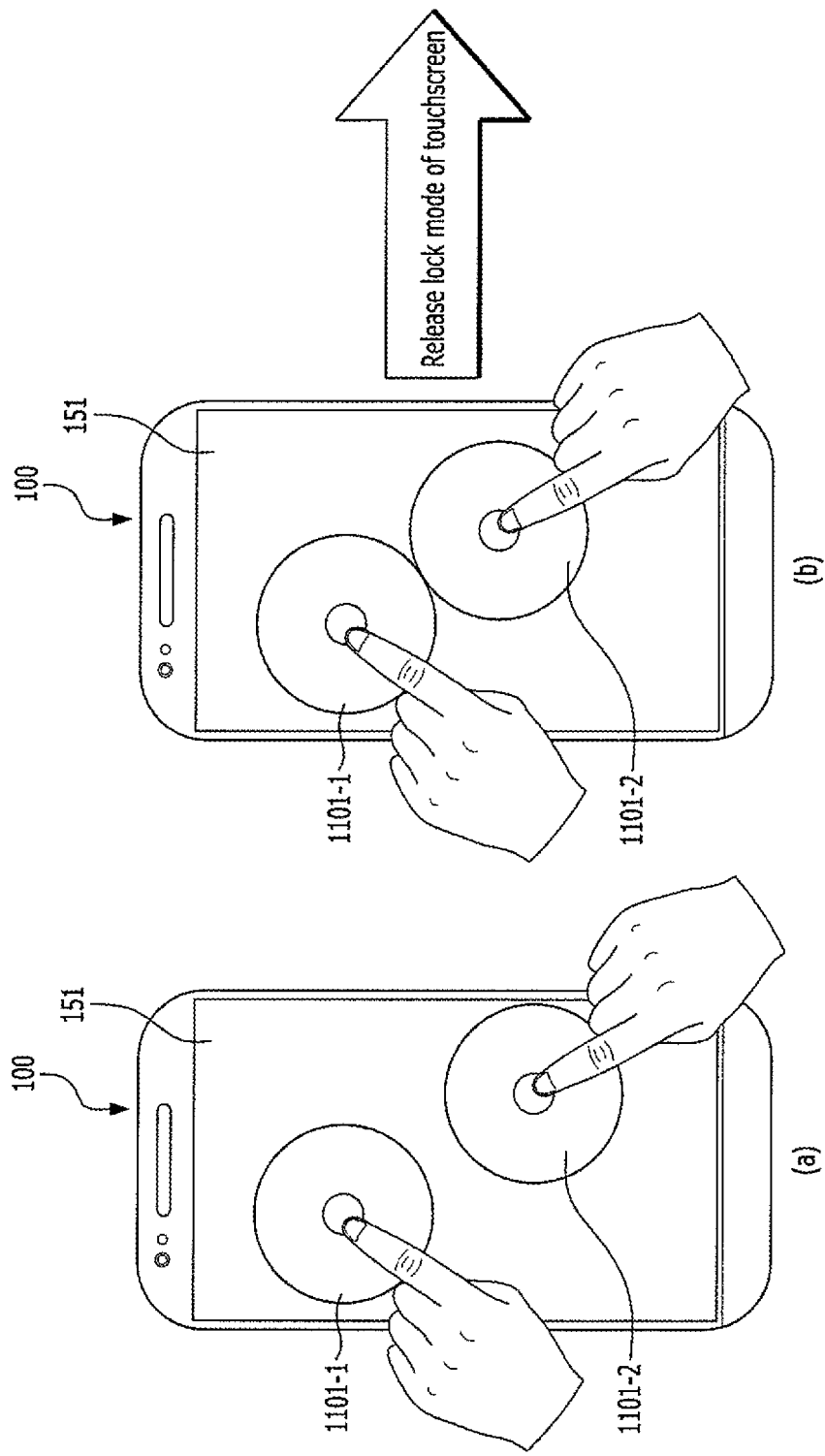

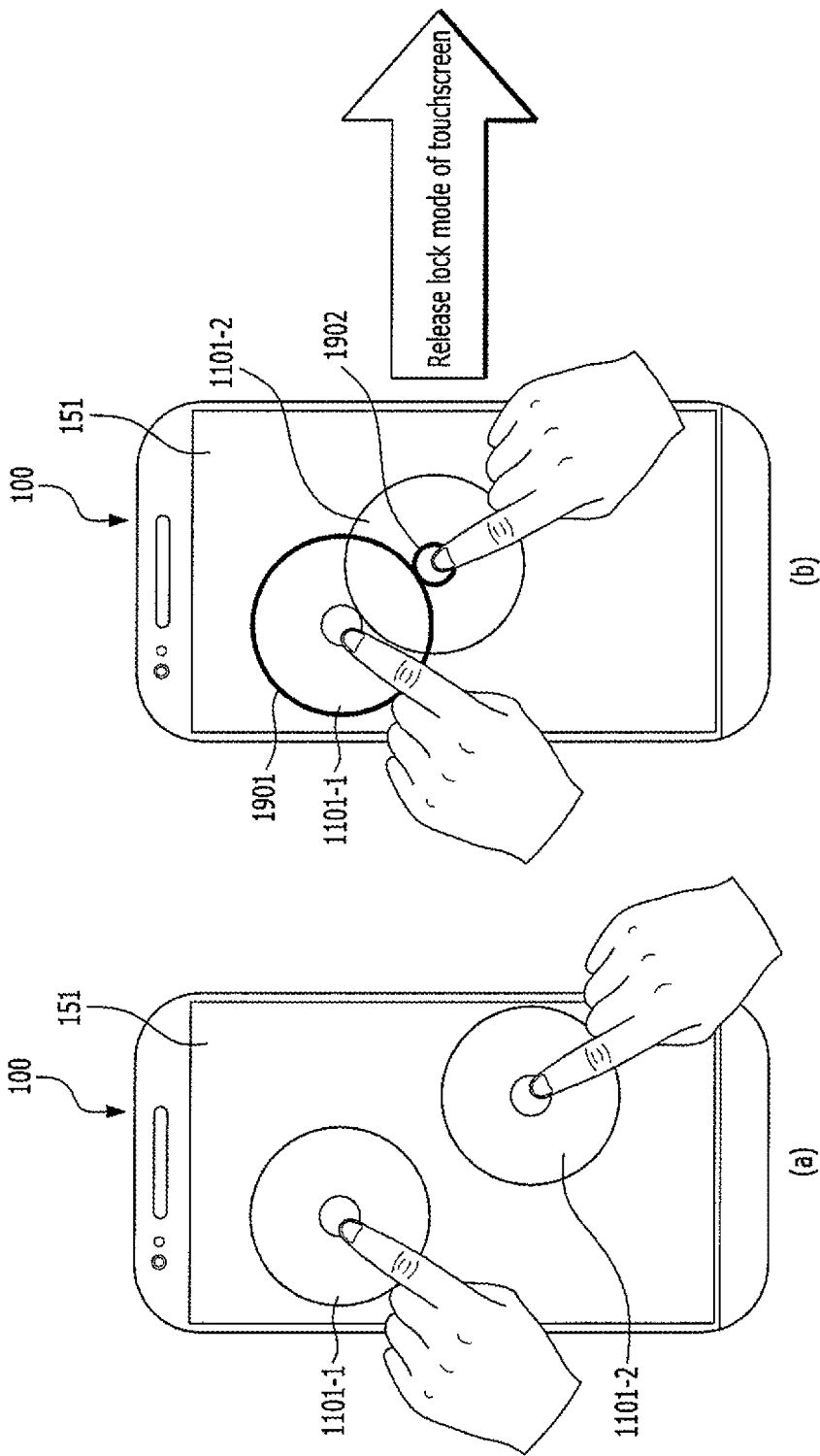

MOBILE TERMINAL AND CONTROLLING METHOD THEREOF

CROSS-REFERENCE TO RELATED APPLICATION(S)

This application claims priority under 35 U.S.C. §119, to Korean Application No. 10-2014-0116018, filed Sep. 2, 2014, whose entire disclosure is hereby incorporated by reference.

BACKGROUND

1. Field

The present disclosure relates to a mobile terminal, and more particularly, to a mobile terminal and controlling method thereof. Although the present disclosure is suitable for a wide scope of applications, it is particularly suitable for facilitating the use of a terminal in further consideration of user's convenience.

2. Background

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

A mobile terminal uses a touchscreen. When the mobile terminal is not in use, it can output a lock screen to the touchscreen to prevent an incorrect input and to enhance security of the mobile terminal. While the lock screen is active, if a touch input is received, since the mobile terminal does not handle the received touch input as a user's command, no function is performed. Thus, the lock screen outputted state can be called a lock mode of the mobile terminal.

Currently, various kinds of methods of unlocking the lock mode are used in various ways. However, these methods are used to unlock a screen only but fail to provide additional functions.

Thus, the demand for a control method of running various functions simultaneously by cancelling a lock mode is increasingly rising.

SUMMARY OF THE INVENTION

Accordingly, embodiments of the present disclosure are directed to a mobile terminal and controlling method thereof that substantially obviate one or more problems due to limitations and disadvantages of the related art.

One object of the present disclosure is to provide a mobile terminal and controlling method thereof, by which a specific user mode can be entered as soon as a lock screen of the mobile terminal having a plurality of users registered thereat is unlocked.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a mobile terminal according to one embodiment of the present disclosure may include a touchscreen configured to recognize at least one touch point at a same timing point and a controller, if a touch pattern for releasing a lock is received through the touchscreen, releasing a lock state of the touchscreen and outputting a preset screen, wherein the touch pattern includes a preset touch pattern corresponding to the number of the at least one touch point recognized at the same timing point.

In another aspect of the present disclosure, as embodied and broadly described herein, a mobile terminal according to another embodiment of the present disclosure may include a touchscreen configured to recognize touch points including a 1st touch point and a 2nd touch point and a controller outputting a 1st circular indicator and a 2nd circular indicator with reference to the 1st touch point and the 2nd touch point, respectively, the controller outputting a 1st object to a region having the 1st and 2nd circular indicators overlap each other, the controller, if a touch gesture for moving either the 1st touch point or the 2nd touch point is received, releasing a lock of the touchscreen.

In further aspect of the present disclosure, as embodied and broadly described herein, a method of controlling a mobile terminal according to further embodiment of the present disclosure may include the steps of recognizing touch points including a 1st touch point and a 2nd touch point, outputting a 1st circular indicator and a 2nd circular indicator with reference to the 1st touch point and the 2nd touch point, respectively, outputting a 1st object to a region having the 1st and 2nd circular indicators overlap each other, and if a touch gesture for moving either the 1st touch point or the 2nd touch point is received, releasing a lock of the touchscreen.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein:

FIG. 1A is a block diagram of a mobile terminal in accordance with the present disclosure;

FIG. 7 is a diagram for a touch pattern to release a lock using a multi-touch according to one embodiment of the present disclosure;

FIG. 18 and FIG. 19 are diagrams for a control method of releasing a lock with security using a multi-touch according to one embodiment of the present disclosure.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
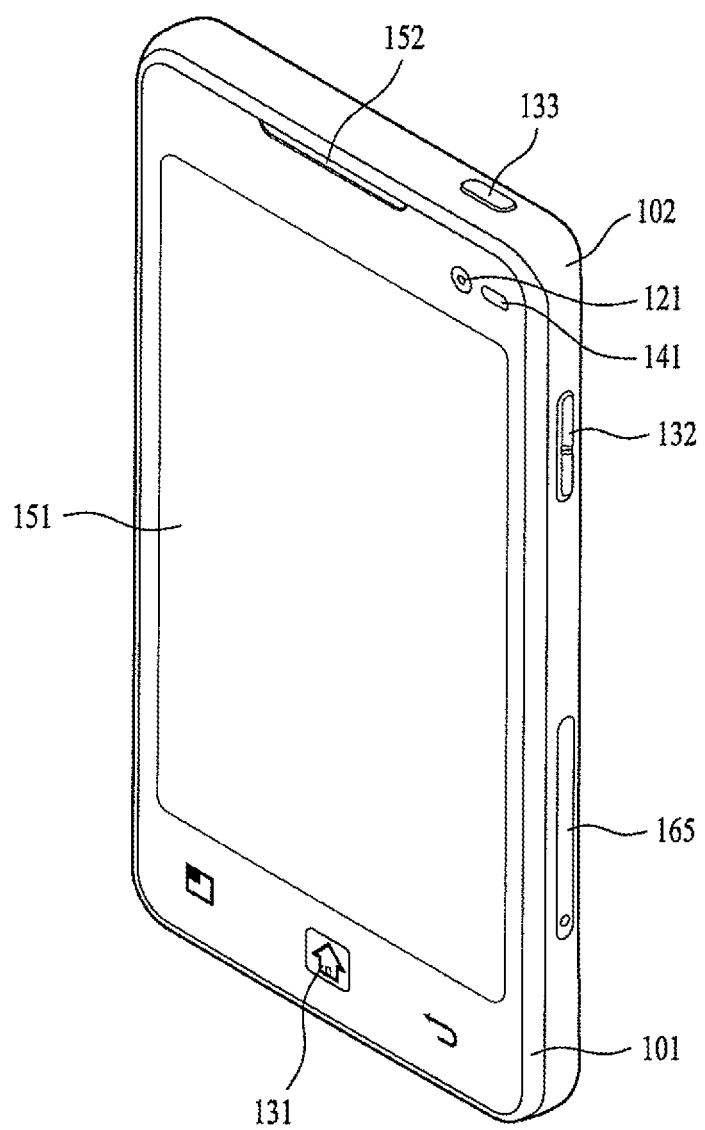
FIGS. 1B and 1C are conceptual views of one example of the mobile terminal, viewed from different directions.
Figure 1C:
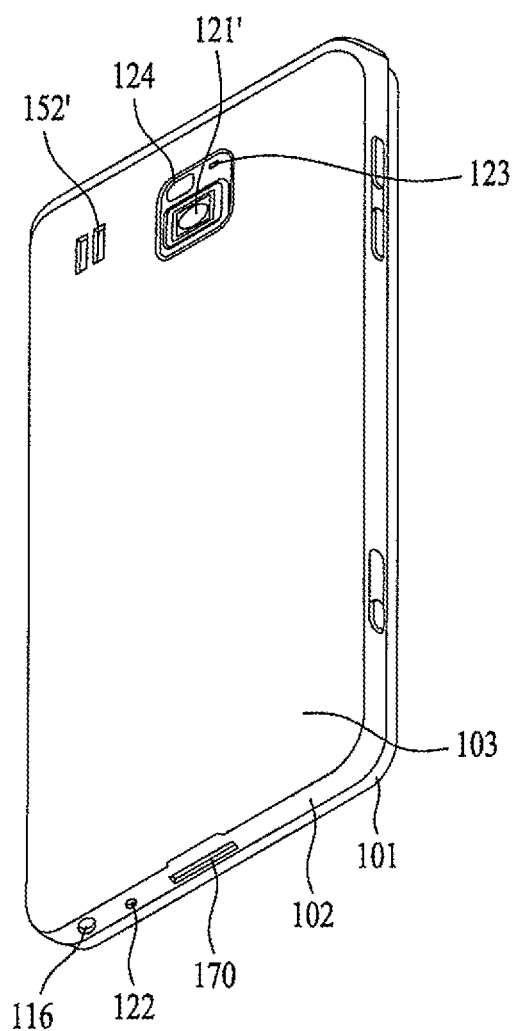

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, informations and the like inputted or outputted through the above-mentioned components and/or runs application programs saved in the memory 170, thereby processing or providing a user with appropriate informations and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present disclosure mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like.

Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the 1st audio output unit 152a, the 2nd audio output unit 152b, the proximity sensor 141, the illumination sensor 142, the light output unit 154, the 1st camera 121a, the 2nd camera 121b, the 1st manipulating unit 123a, the 2nd manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

Further preferred embodiments will be described in more detail with reference to additional drawing figures. It is understood by those skilled in the art that the present features can be embodied in several forms without departing from the characteristics thereof.

When a touchscreen is not in use, it can operate in lock mode for the prevention of malfunction and the security. In this case, the lock mode means an operating mode for not receiving a touch command from a user (or, an operating mode for not performing a function despite receiving a touch command for the function from a user). And, a lock screen may mean a screen outputted in the lock mode.

There are various methods for releasing the lock mode. For instance, if a password or a preset touch drag pattern is inputted or a preset tapping pattern is recognized, a lock mode is released and a preset screen can be outputted.

Yet, according to the above-described method, since the lock mode or the lock screen released only, it is disadvantageous in failing to provide a user with convenience in displaying various informations or running an appropriate function.

As the number of convenience functions through a mobile terminal increases gradually, security becomes important. Particularly, when several users share a mobile terminal of a tablet type with each other, since a use history of a specific user can be read by another user, it is disadvantageous in that privacy protection gets vulnerable.

Therefore, according to one embodiment of the present disclosure, when a lock mode is released, it is proposed to perform a specific function as well. According to one embodiment of the present disclosure, it is intended to provide a control method for providing various functions runnable on a lock screen. Such embodiments are described in detail with reference to the accompanying drawings as follows.

Figure 2:
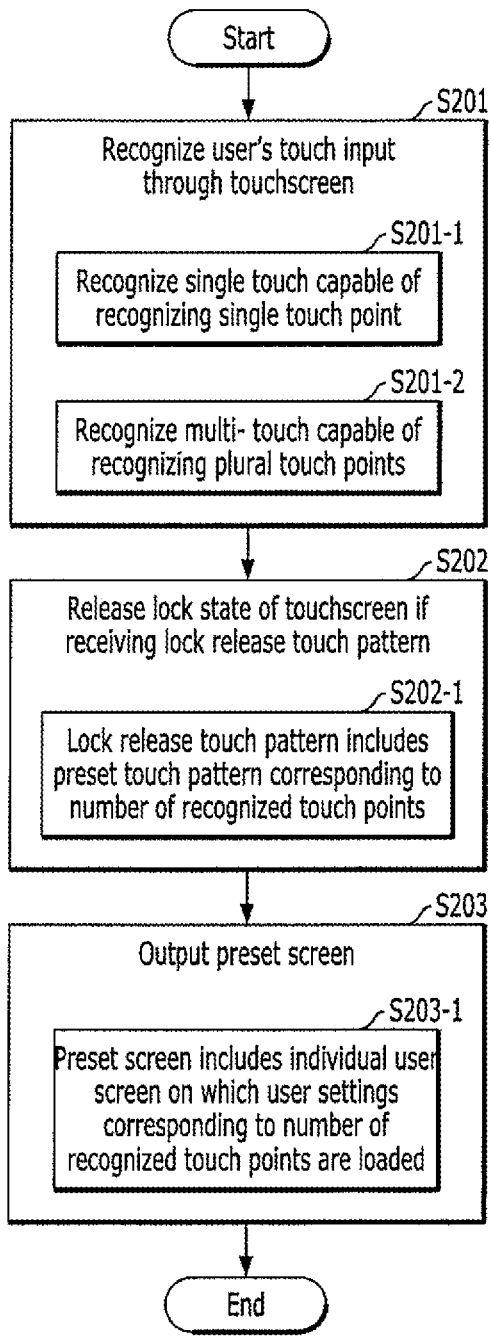
FIG. 2 is a flowchart of a process for loading an individual user screen based on a touch pattern inputted to a lock screen according to one embodiment of the present disclosure.
Figure 3:
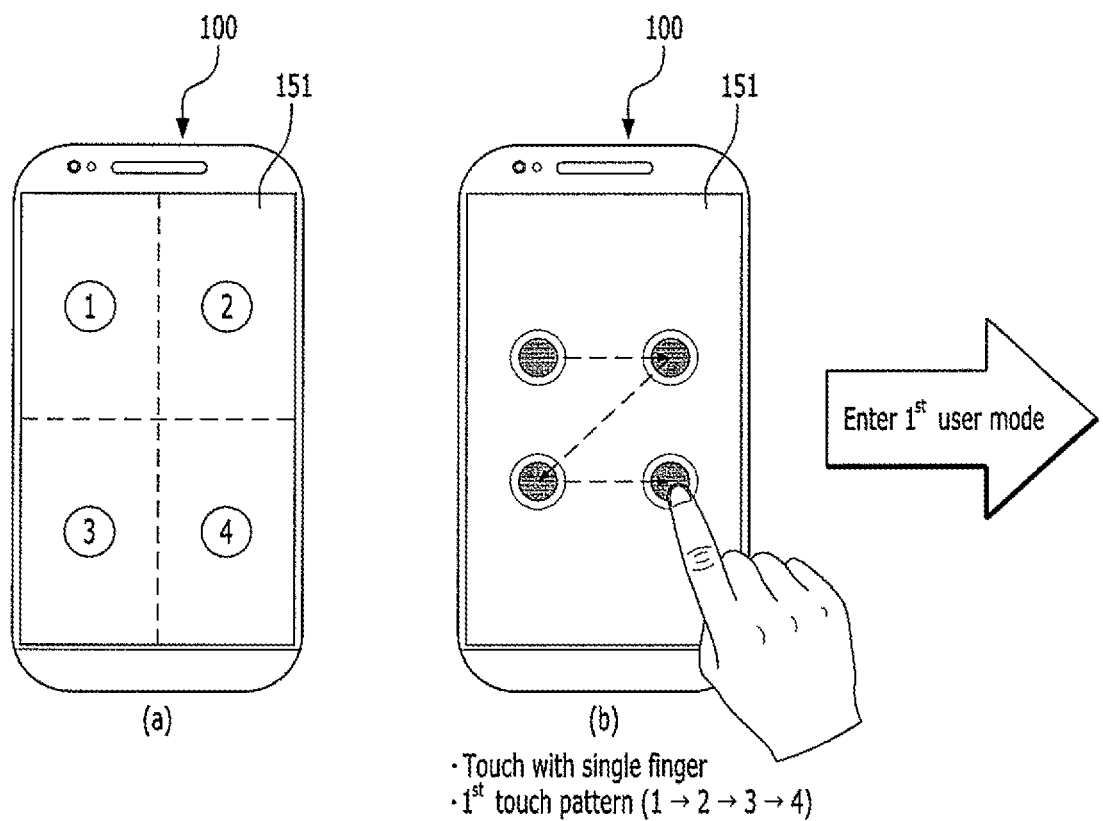
FIG. 3 and FIG. 4 are diagrams of configurations of a control method for loading an individual user screen based on a touch pattern inputted to a lock screen according to one embodiment of the present disclosure.
Figure 4:
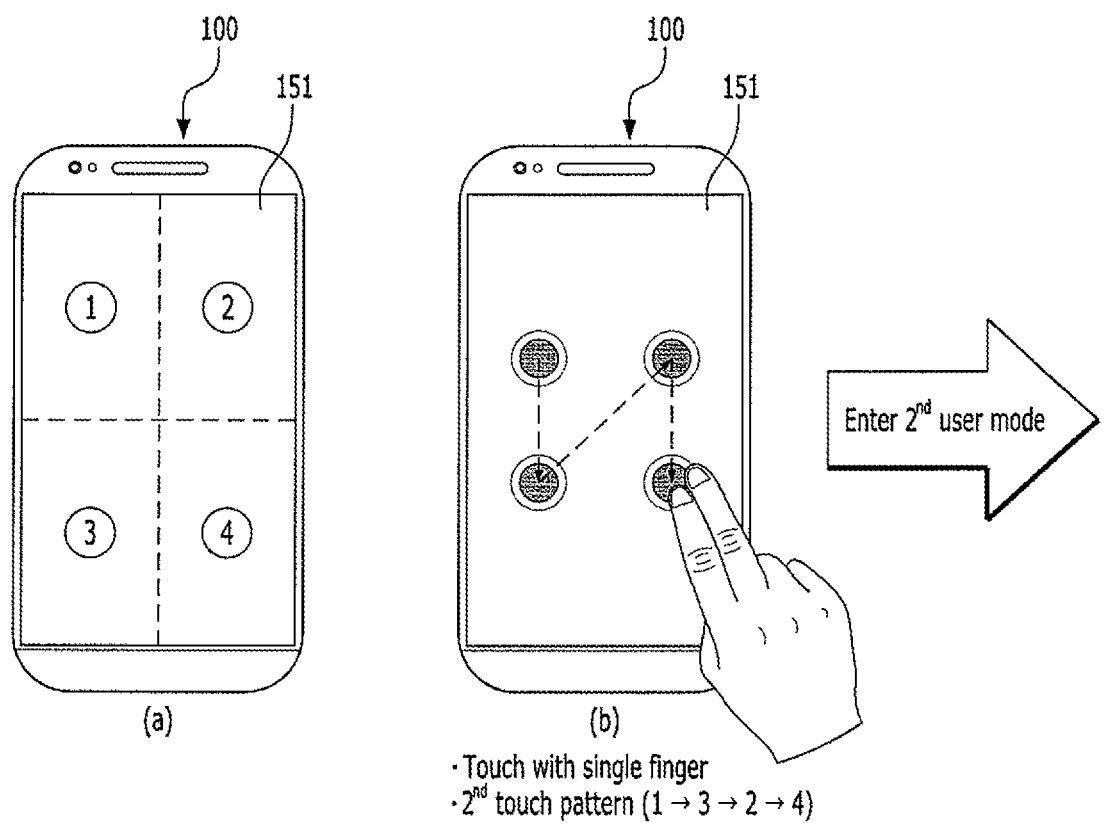

FIG. 2 is a flowchart of a process for loading an individual user screen based on a touch pattern inputted to a lock screen according to one embodiment of the present disclosure. FIG. 3 and FIG. 4 are diagrams of configurations of a control method for loading an individual user screen based on a touch pattern inputted to a lock screen according to one embodiment of the present disclosure. The following description shall be made with reference to FIGS. 2 to 4.

First of all, referring to FIGS. 2 to 4, the touchscreen 151 of one embodiment of the present disclosure can recognize a multi-touch capable of recognizing a plurality of touch points at the same timing point as well as a single touch capable of recognizing a prescribed touch point. In a step S201, the controller 180 can recognize a user's touch input through the touchscreen. In doing so, the step S201 may include a step S201-1 of recognizing a single touch for recognizing a prescribed touch point and a step S201-2 of recognizing a multi-touch for recognizing a plurality of touch points simultaneously. Optionally, the single touch recognizing step S201-1 and the multi-touch recognizing step S201-2 may not be distinguished from each other separately.

In a step S202, if a touch pattern for releasing a lock mode of the touchscreen 151 is received, the controller 180 can release a lock of the touchscreen 151.

According to one embodiment of the present disclosure, the touch pattern for releasing the lock mode of the touchscreen 151 can distinguish the number of finger(s) (i.e., touch object(s)) for a touch of a prescribed portion of the touch pattern at least.

Meanwhile, according to one embodiment of the present disclosure, in a situation that a plurality of users currently use a single mobile terminal 100, it is proposed to distinguish the users by distinguishing the touch pattern. For instance, if a 1st touch pattern is inputted, the corresponding user can be determined as a 1st user. For another instance, if a 2nd touch pattern is inputted, the corresponding user can be determined as a 2nd user.

Moreover, according to one embodiment of the present disclosure, it is proposed to distinguish users by distinguishing the number of touch point(s) for inputting a touch pattern. In particular, this is to facilitate the distinguishment by differentiating the number of finger(s) (i.e., touch object(s) for inputting a touch pattern for releasing a lock per user.

In particular, in setting up a touch pattern individually, a user is able to set up the touch pattern together with the number of touch points.

So to speak, the touch pattern may correspond to the number of the touch points [S202-1].

Table 1 in the following contains one example of a touch pattern set up for each user.

TABLE 1

| User | No. of touch point(s) applied simultaneously | Touch pattern |
|---|---|---|
| 1$^{st}$ user | 1 | 1 → 2 → 3 → 4 |
| 2$^{nd}$ user | 2 | 1 → 3 → 2 → 4 |
| ... | ... | ... |

One example of a control method for entering a user mode for the 1st or 2nd user contained in Table 1 is described in detail with reference to FIG. 3 or FIG. 4 as follows.

Referring to FIG. 3, when the number of the touch point(s) is a 1st number, if a 1st touch pattern is applied, the controller 180 can enter a 1st user mode. According to the example shown in FIG. 3, since the 1st touch pattern is applied using a single finger, the number of the touch point may be 1.

In this case, the touch pattern may include a plurality of touch inputs sequentially applied to at least one of a plurality of virtual regions generated from partitioning the touchscreen based on a preset order [FIG. 3 (a)]. According to the example shown in FIG. 3, after the whole touchscreen 151 has been partitioned into 4 virtual regions, the touch pattern may include a plurality of touch inputs (e.g., 1→2→3→4) applied in a manner of sequentially touching at least one of the partitioned regions. In this case, the virtual regions are denoted by being numbered as 1 to 4, respectively.

The above-mentioned partitioning method is just one example only, by which the present disclosure is non-limited.

In a step S203, the controller 180 releases the lock screen and is also able to output a preset screen simultaneously. One example of the preset screen may include an output of a home screen. In the following description, the home screen is further explained in detail.

First of all, the home screen 800 may be generally defined as a screen initially displayed on the touchscreen 151 when a locked state of the touchscreen 151 is released. At least one icon or widget for running an application or an internal function may be displayed on the home screen 800. Optionally, at least two home screens 800 may exist in the mobile terminal 100. In this case, when a prescribed touch gesture is performed on the touchscreen 151, the at least two home screens 800 may sequentially displayed one by one. Different icons (widgets) may be disposed on the home screens 800, respectively.

Meanwhile, according to one embodiment of the present disclosure, if the 1st user mode is entered, the controller 180 can output a 1st individual user screen to which settings for the 1st user are loaded [S203-1].

In this case, the user settings may include a disposition of an application launch icon on the home screen, a use authority of an application, an authority for changing the mobile terminal settings, a reading authority of a folder containing contents, a background screen, a contact loaded on a contact application, a transceiving agent of a message application, a font, a font size and the like.

Referring to FIG. 4, when the number of the touch points is a 2nd number, if a 2nd touch pattern (e.g., 1→3→2→4) is applied, the controller 180 can enter a 2nd user mode. According to the example shown in FIG. 4, since the 2nd touch pattern is applied using two fingers, the number of the touch points may be 2.

In this case, since a user can be distinguished from the number of the touch point(s), it is able to use the 1st touch pattern and the 2nd touch pattern independently.

Likewise, according to one embodiment of the present disclosure, if the 2nd user mode is entered in FIG. 4, the controller 180 can output a 2nd individual user screen to which settings for the 2nd user are loaded [S203-1].

Like the example mentioned in the above description, it is advantageous that a user can be easily distinguished using the number of finger(s) for a touch.

According to the example shown in FIG. 4, it is able to being an advantageous effect in that a user can be easily distinguished using the number of the touching fingers.

For convenience, according to the embodiment described with reference to FIG. 4, the case that the number of the touch points is 2 is taken as an example. And, various modified methods are possible. For instance, if the number of the touch points equal to or more than the set number in the input of a touch pattern is 2, the controller 180 can recognize it as distinguished from a touch pattern having an input of every touch pattern include a single touch point. For another instance, if the number of touch points of a set turn (e.g., a 3rd touch input in a 4-digit touch pattern) in an input of a touch pattern is 2, the controller 180 can recognize it as distinguished from a touch pattern having an input of the set turn include a single touch point. This method can provide the advantageous effects as follows. First of all, it is able to increase the number of passwords settable using the number of the touching fingers. Secondly, it is able to distinguish users.

For instance, if the number of a touch point is 1, the controller 180 recognizes the touch inputs to the partitioned virtual regions as 1, 2, 3 and 4, as shown in FIG. 3 (a). Yet, if the number of touch points is 2, the controller 180 recognizes the touch inputs to the partitioned virtual regions as 5, 6, 7 and 8. In particular, if the number of the touch points in each of the regions 1 to 4 is 2, as shown in FIG. 3 (a), the controller 180 recognizes the touch inputs as 5, 6, 7 and 8, respectively. Therefore, by combining multi-touch points with a touch pattern, more passwords can be set to enhance security.

The above-described user settings may include a guest setting of applying a hide/security setting to a prescribed launch icon or restricting a launch authority on a prescribed function.

Other embodiments for entering various modes using the multiple touches are described in detail with reference to FIG. 5 and FIG. 6 as follows.

Figure 5:
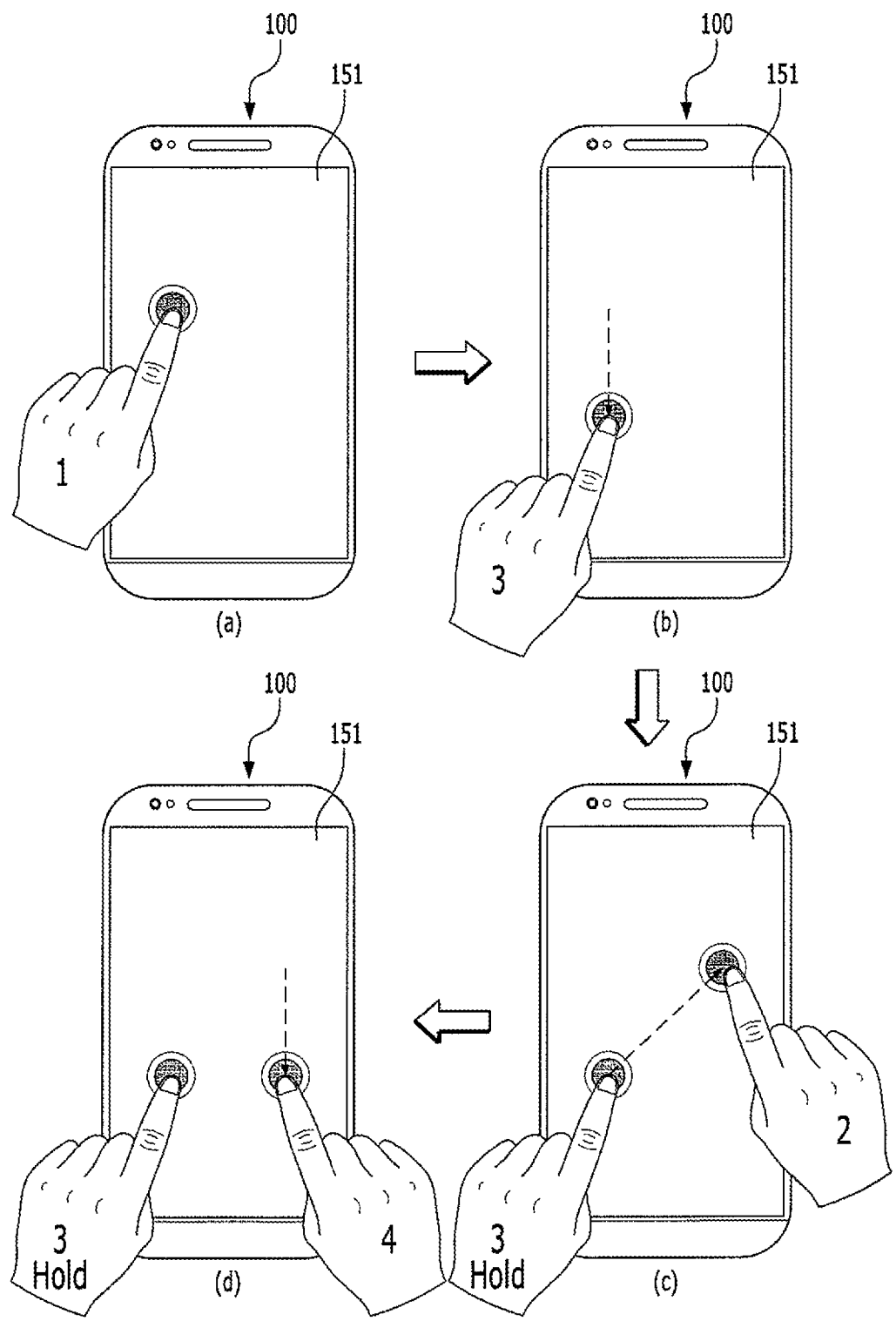
FIG. 5 and FIG. 6 are diagrams for a control method for entering a different mode using a multi-touch in inputting a touch pattern for releasing a lock screen according to one embodiment of the present disclosure.
Figure 6:
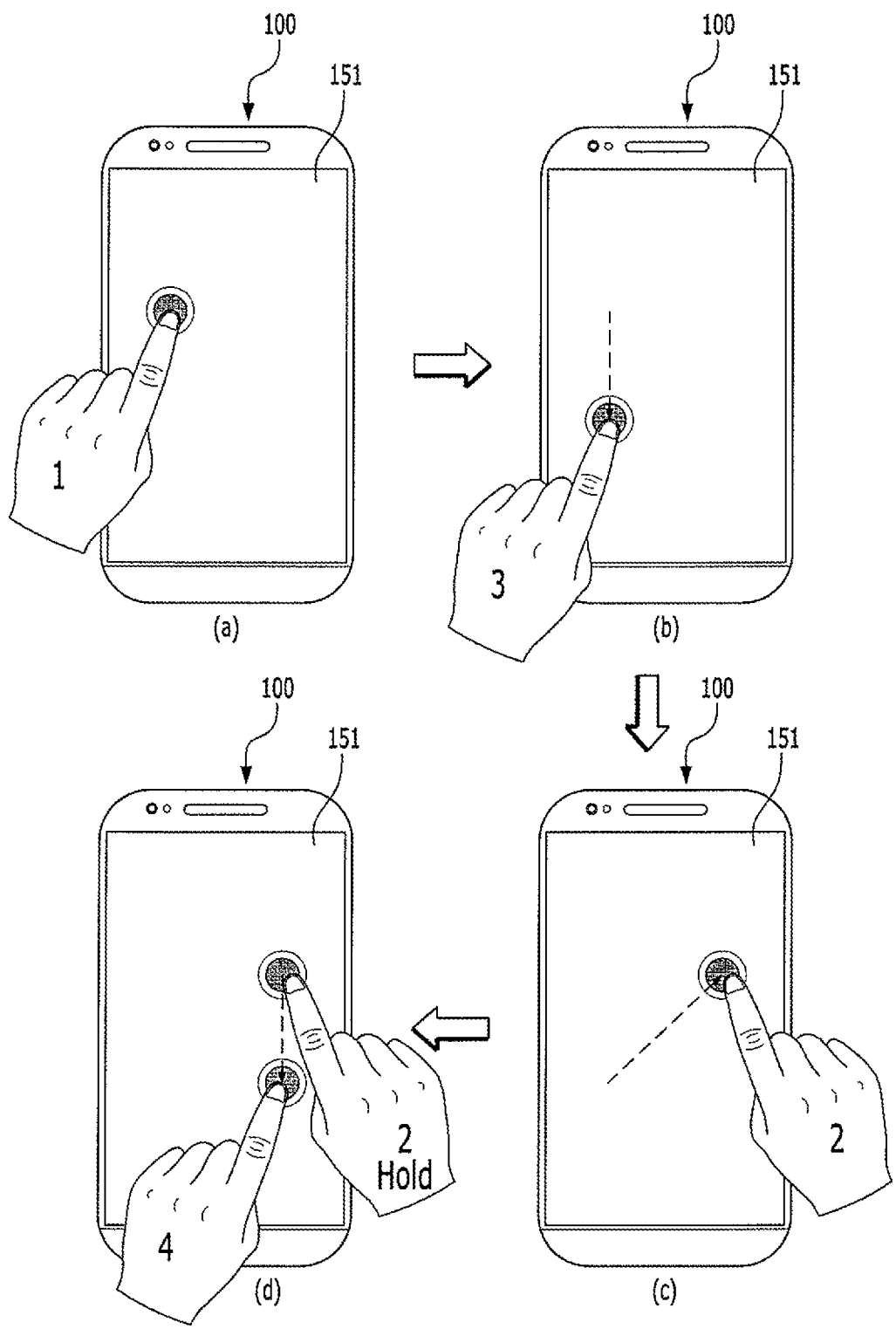

FIG. 5 and FIG. 6 are diagrams for a control method for entering a different mode using a multi-touch in inputting a touch pattern for releasing a lock screen according to one embodiment of the present disclosure.

In FIG. 5 and FIG. 6, the mobile terminal 100 currently outputs a lock screen. And, assume that a touch pattern for outputting the lock screen is set to 1→3→2→4 in advance. In this case, as mentioned in the foregoing description, each numeral means the numbering of a virtual region resulting from partitioning the touchscreen 151. In particular, if the partitioned virtual regions are touched in order of 1→3→2→4, the controller 180 can release the lock screen.

According to one embodiment of the present disclosure, if a touch pattern is inputted by maintaining (holding) a touch for a prescribed turn in a preset touch pattern, it is proposed to enter a distinguished mode.

Referring to FIG. 5, in sequentially inputting a preset touch pattern '1→3→2→4', a user applies touch inputs to '2' and '4' for a 3rd turn and a 4th turn by maintaining (holding) a touch to '3' for a 2nd turn. If such a touch pattern is inputted, the controller 180 releases a lock mode and is also able to enter a 1st operating mode simultaneously.

Referring to FIG. 6, in sequentially inputting a preset touch pattern '1→3→2→4', a user applies a touch input to '4' for a 4th turn by maintaining (holding) a touch to '2' for a 3rd turn. If such a touch pattern is inputted, the controller 180 releases a lock mode and is also able to enter a 2nd operating mode simultaneously.

In the drawings, one hand for maintaining a touch and the other hand for inputting a pattern are distinguished from each other. Moreover, it is obvious that the same input can be performed using a single hand.

The operating mode may mean an individual user mode described with reference to FIGS. 2 to 4 or a mode (e.g., a guest mode, a 1st level security mode, a 2nd level security mode, etc.) distinguished in accordance with a security level.

In the following description, with reference to FIG. 7, another touch pattern using a multi-touch is proposed.

FIG. 7 is a diagram for a touch pattern to release a lock using a multi-touch according to one embodiment of the present disclosure.

According to one embodiment of the present disclosure related to FIG. 7, a lock mode is released in response to an input of a touch drag 10a received together with a multi-touch. And, it is proposed to enter a mode distinguished depending on a relative location among a plurality of touch points configuring the multi-touch.

Particularly, according to this embodiment of the present disclosure, a multi-touch can be used as if inputting a guitar code. For instance, if a multi-touch is applied as if inputting a 1st code 701-1, a 1st mode can be entered. For another instance, if a multi-touch is applied as if inputting a 1st code 701-2, a 2nd mode can be entered.

According to the above-described embodiments, a prescribed mode is entered as soon as a lock mode is released. Yet, according to another embodiment of the present disclosure, proposed is a control method of running a prescribed application directly as soon as releasing a lock mode. Such an embodiment shall be described in detail with reference to FIG. 8 and FIG. 9 as follows.

Figure 8:
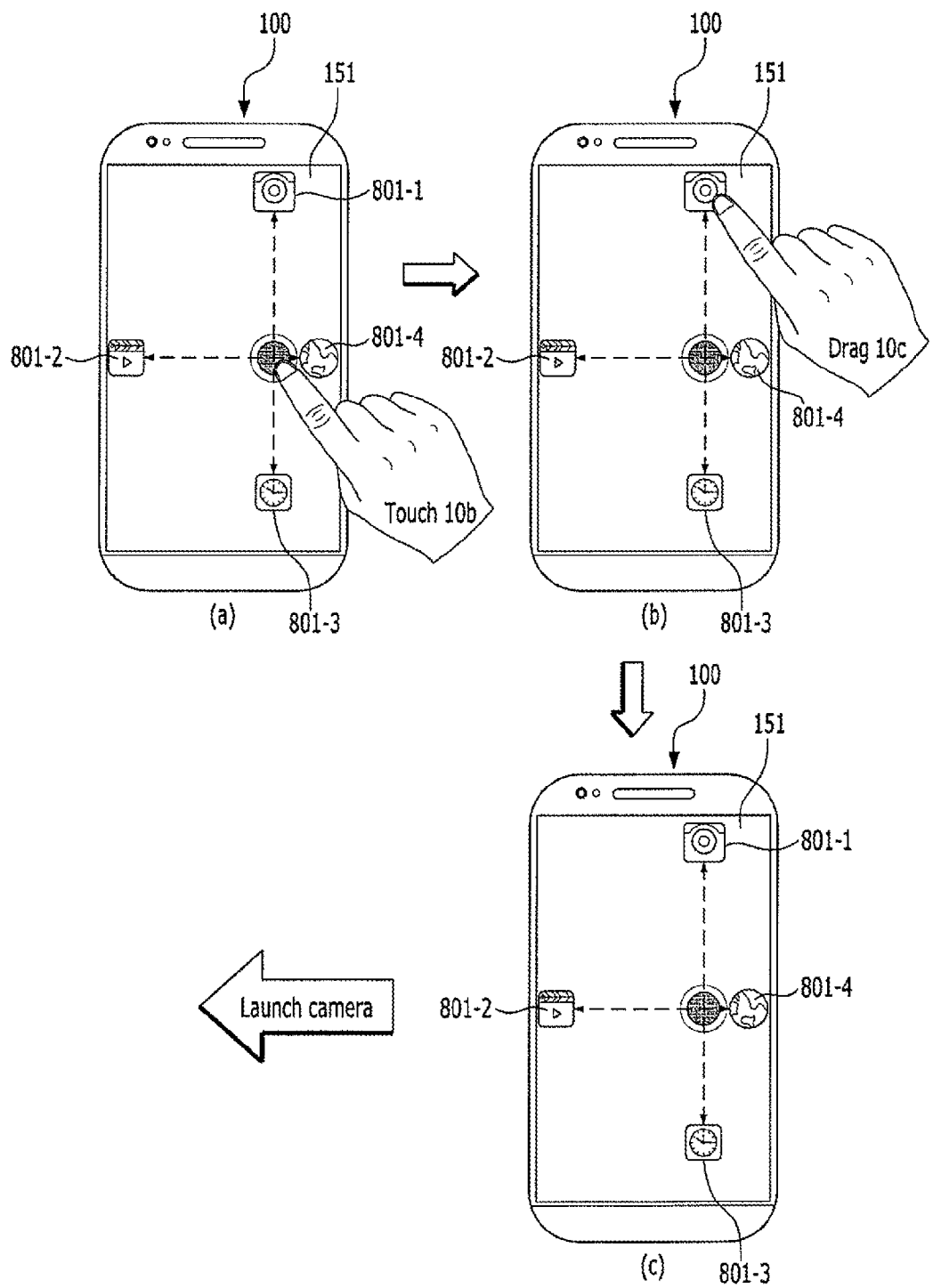
FIG. 8 is a diagram for a control method of running a prescribed application together with a release of a lock mode according to one embodiment of the present disclosure.

FIG. 8 is a diagram for a control method of running a prescribed application together with a release of a lock mode according to one embodiment of the present disclosure.

Referring to FIG. 8 (a), the mobile terminal 100 currently outputs a lock screen through the touchscreen 151. And, a user's touch input 10b using a single finger is currently maintained on the lock screen.

While the touch is maintained, the controller 180 can dispose 1st to 4th application launch icons 801-1 to 801-4 in prescribed directions (e.g., top, bottom, right and left directions) on the touchscreen 151.

After a touch input 10c of dragging to the 1st application launch icon 801-1 has been received, if the touch input 10c is released from the 1st application launch icon 801-1, the controller 180 releases a lock mode and is also able to launch an application corresponding to the 1st application launch icon 801-1 simultaneously. In particular, referring to FIG. 8 (b) and FIG. 8 (c), after the a touch drag 10c has been applied to a camera launch icon 801-1, if a corresponding touch is released, the controller 180 releases a lock mode and is also able to launch a camera application simultaneously.

Meanwhile, the application launch icons 801-1 to 801-4 may be able to output icons previously set by a user or system.

Moreover, the embodiment described with reference to FIG. 8 may be implemented in association with the touch pattern inputs described with reference to FIGS. 2 to 4. In particular, after a prescribed touch pattern for releasing a lock mode has been inputted, if a corresponding touch is held instead of being released, as shown in FIG. 8 (a), the embodiment related to FIG. 8 can be implemented by outputting the application launch icons 801-1 to 801-4.

Figure 9:
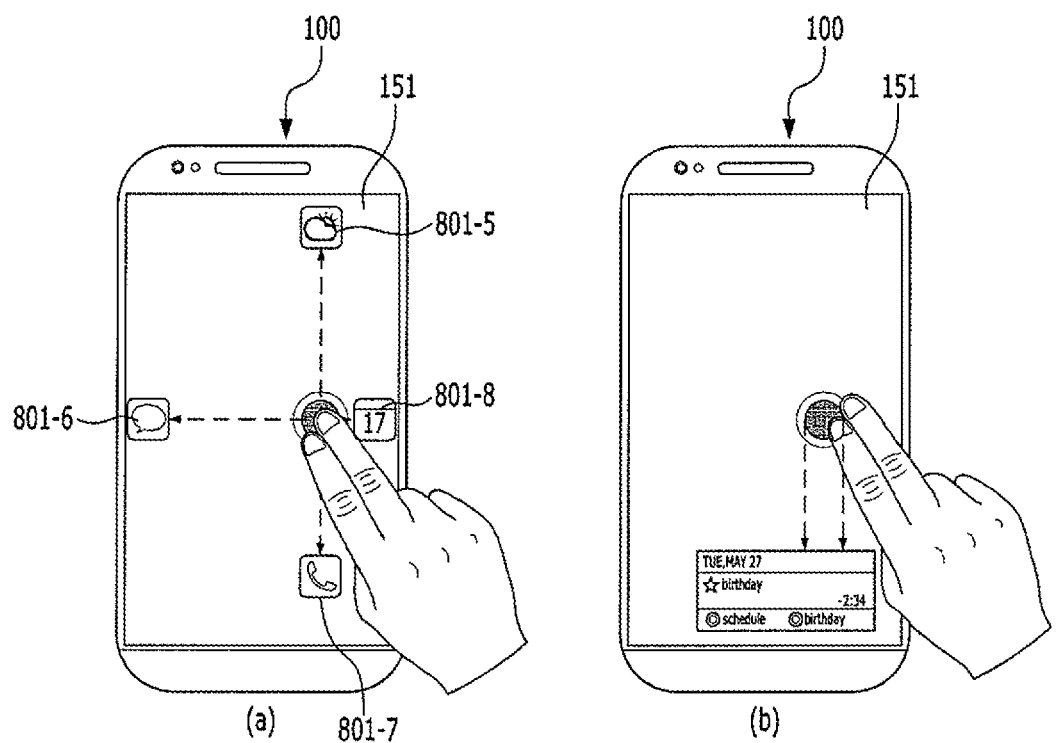
FIG. 9 is a diagram for a running example distinguished in accordance with the number of touch points recognized at the same timing point.

FIG. 9 is a diagram for a running example distinguished in accordance with the number of touch points recognized at the same timing point.

Referring to FIG. 9 (a), unlike FIG. 8 (a), two touch points are currently recognized. If the two touch points are recognized, the controller 180 can output 5th to 8th application launch icons 801-5 to 801-8. Like FIG. 8, after an input of a drag to a prescribed icon has been performed by holding a touch, if the input is released, a function corresponding to the prescribed icon is launched and a lock mode can be released as well.

Unlike the example shown in FIG. 9 (a), if two touch points are recognized, referring to FIG. 9 (b), the controller 180 can output a detailed information 901.

In particular, depending on the number of touch points recognized at the same timing point, it may be able to distinguish an output of an icon and an output of a prescribed information from each other.

According to the embodiment described so far, proposed is a control method of launching a different mode depending on the number of touch point(s) in case of a single touch/multi-touch and outputting information. In the following description of an embodiment, a control method of facilitating an access to a prescribed function based on a multi-touch by outputting a virtual circular indicator and controlling the outputted indicator is described.

Figure 10:
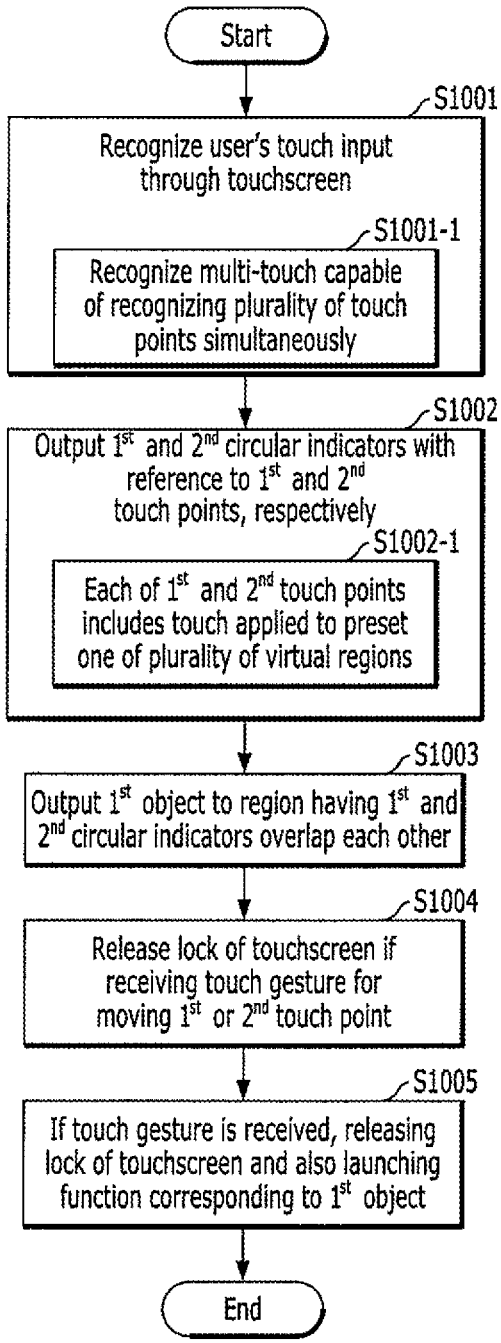
FIG. 10 is a flowchart for a control method of controlling a lock screen by outputting virtual circular indicators to touch points of a multi-touch according to one embodiment of the present disclosure.

FIG. 10 is a flowchart for a control method of controlling a lock screen by outputting virtual circular indicators to touch points of a multi-touch according to one embodiment of the present disclosure.

Referring to FIG. 10, in a step S1001, the controller 180 recognizes a touch input of a user through the touchscreen 151. In this case, the step S1001 may further include a step S1001-1 of recognizing a multi-touch capable of recognizing a plurality of touch points simultaneously.

In a step S1002, the controller 180 can output a 1st circular indicator and a 2nd circular indicator with reference to a 1st touch point and a 2nd touch point, respectively.

Theses circular indicators shall be further described in detail with reference to FIG. 11 as follows.

Figure 11:
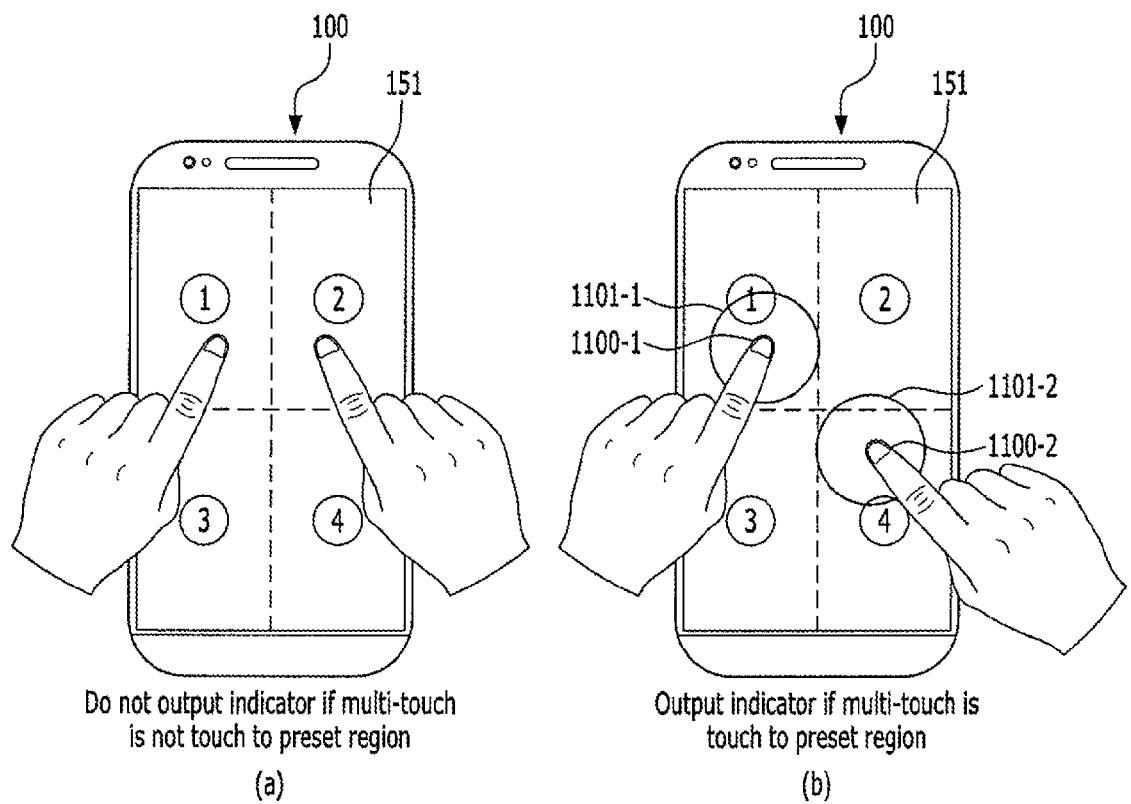
FIG. 11 is a diagram for one example of a circular indicator outputted with reference to a touch point according to one embodiment of the present disclosure.

FIG. 11 is a diagram for one example of a circular indicator outputted with reference to a touch point according to one embodiment of the present disclosure.

Referring to FIG. 11 (b), a user's multi-touch is applied to a 1st touch point 1100-1 and a 2nd touch point 1100-2 on a lock screen of the touchscreen 151. If this multi-touch is applied in lock mode, it is proposed that the controller 180 outputs circular indicators 1101-1 and 1101-2 with reference to the 1st touch point 1100-1 and the 2nd touch point 1100-2, respectively.

A control method for facilitating an access to a prescribed function by releasing the lock mode by controlling the outputted virtual circular indicators shall be described later.

Moreover, according to one embodiment of the present disclosure, after the touchscreen 151 has been partitioned into a plurality of virtual regions, if a preset region included in a plurality of the partitioned virtual regions is touched, it is proposed to output the circular indicator. In particular, each of the 1st touch point and the 2nd touch point may include a touch applied to a preset virtual region included in a plurality of the virtual regions [S1002-1][cf. flowchart shown in FIG. 10].

Referring to FIG. 11 (*a*), a whole region of the touchscreen 151 is partitioned into 4 virtual regions. And, each of the virtual regions is numbered in the drawing. According to the example shown in the drawing, assume that a region ① and a region ④ among the 4 virtual regions are set in advance.

Referring to FIG. 11 (*a*), if each touch point is not located in a preset region (e.g., a region ① and a region ②), the controller 180 may not output circular indicators. Referring to FIG. 11 (*b*), if each touch point is located in a preset region (e.g., a region ① and a region ④), the controller 180 may output a 1st circular indicator 1100-1 and a 2nd circular indicator 1100-2.

For clarity of the following drawings, a touch point and a hand for designating the touch point are omitted but a circular indicator may be illustrated only.

Referring now to FIG. 10, in a step S1003, the controller 180 can output a 1st object to a region in which the 1st circular indicator and the 2nd circular indicator overlap each other. In this case, the 1st object may include at least one of an application launch icon, a schedule notification object, a missed call notification object, and an application widget. The object output and the inter-object switching shall be described in detail with reference to FIGS. 12 to 16.

In a step S1004, the controller 180 can release the lock mode of the touchscreen if receiving a prescribed touch gesture for moving the 1st or 2nd touch point. In this case, the prescribed touch gesture for moving the 1st or 2nd touch point may include an input of a drag by holding a touch.

Moreover, according to one embodiment of the present disclosure, if a lock release condition is met by a prescribed touch gesture, the controller 180 can release a lock mode. If a touch is released in a state that the lock release condition is not met, the controller 180 may maintain the lock mode intact.

For example, the lock release condition may include a condition described as follows. First of all, a size of an overlapping area between the outputted 1st and 2nd circular indicators is changed by a touch gesture. Secondly, a touch is released in a state that the changed size of the corresponding region belongs to a prescribed range. While the condition is not met (e.g., the 1st and 2nd circular indicators fail to overlap each other at all), if the touch is released, the controller 180 can maintain the lock mode intact.

It is obvious that the condition for releasing the touch in the state that the size of the overlapping region belongs to the prescribed range can be substituted with a condition for releasing the touch in a state that a distance between the touch gestures belongs to a prescribed range.

In a step S1005, if the touch gesture is received in the step S1004, the controller 180 unlocks the touchscreen and is also able to launch a function corresponding to the outputted 1st object simultaneously.

The steps S1003 to S1005 are described in detail with reference to the accompanying drawings as follows.

Figure 12:
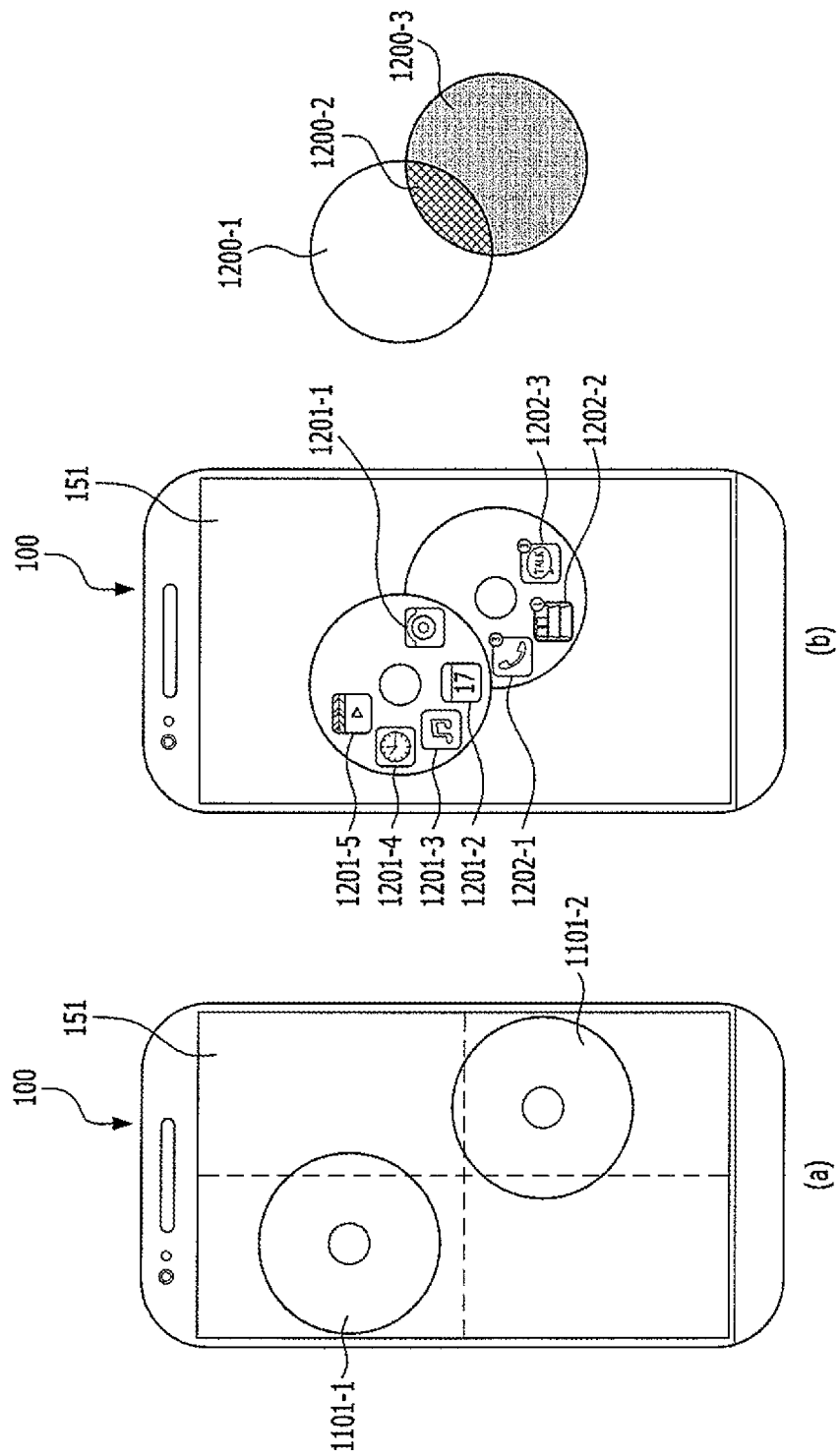
FIG. 12 and FIG. 13 are diagrams for one example of an object outputtable to an overlapping region of a circular indicator according to one embodiment of the present disclosure.
Figure 13:
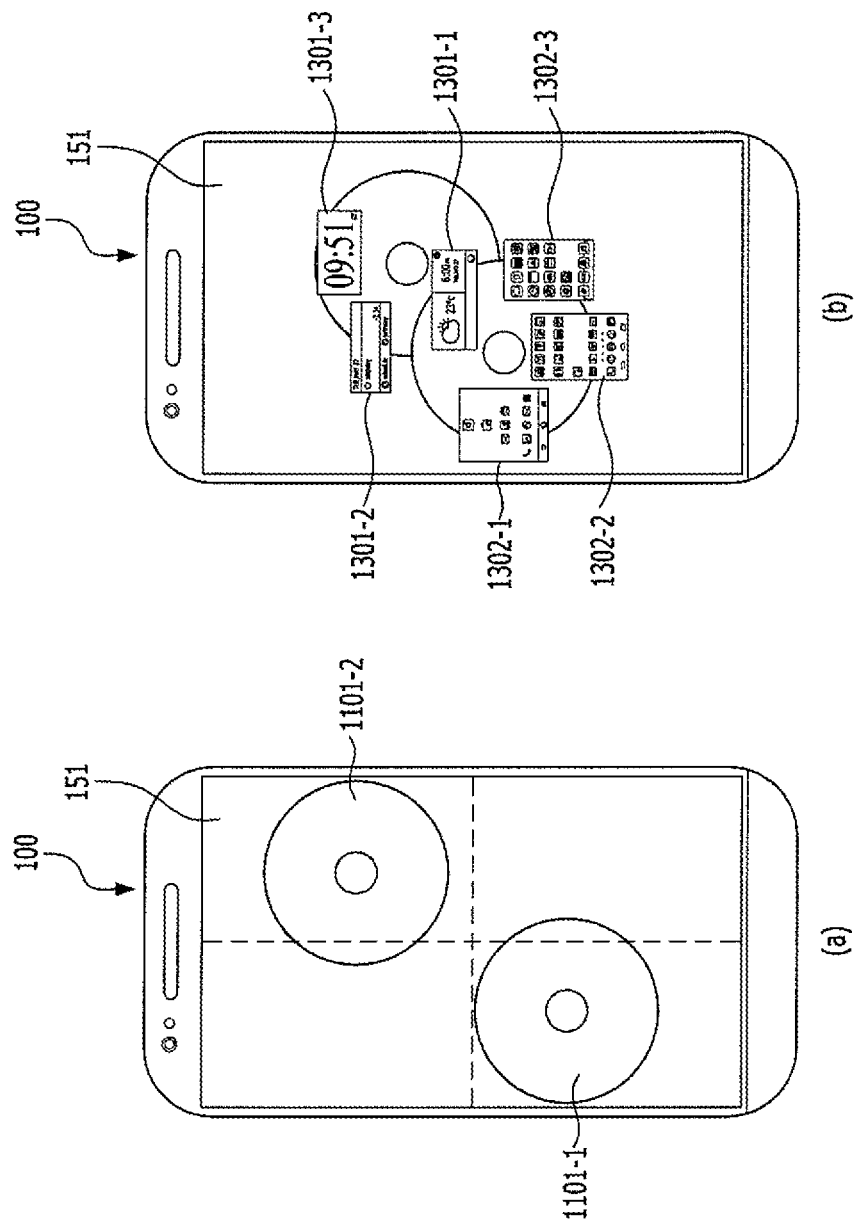

FIG. 12 and FIG. 13 are diagrams for one example of an object outputtable to an overlapping region of a circular indicator according to one embodiment of the present disclosure.

Referring to FIG. 12 (*a*), touch points by a multi-touch are located in a region ① and a region ④ corresponding to the preset regions included in a plurality of virtual regions obtained from partitioning the touchscreen 151. Hence, the controller 180 can output a circular indicator with reference to each of the touch points.

Meanwhile, a multi-touch input applied to the touchscreen 151 may include a touch input received after receiving a touch gesture (cf. FIGS. 3 to 7) for releasing a lock of the touchscreen 151. The multi-touch input applied to the touchscreen 151 may include a touch input received to release a lock in a state that the touchscreen 151 is turned off. In this case, the lock may mean a state that a password (cf. FIGS. 3 to 7) has been set or a state before entering a home screen in a state that a password is not set. For instance, while the touchscreen 151 of the terminal is turned off, if an input of a power key is received, the controller 180 turns on the touchscreen 151 and is then able to display a lock screen. In this case, the lock screen is different from a home screen and may mean a screen prior to entering the home screen despite displaying an icon, a widget and the like. If a password is set, the controller 180 can receive the password through a combination of a touch and drag set on a lock screen. If the set password is received, the controller 180 releases the lock and displays the home screen. If a password is not set, the controller 180 can receive an input for a release of a lock without the password through a combination of a touch and drag set on a lock screen. In this case, the input for the lock release without the password may include an input of a drag applied over a predetermined distance for example. If the set lock release input is received, the controller 180 releases the lock and displays the home screen.

As the touch points are moved, if the 1st circular indicator 1101-1 and the 2nd circular indicator 1101-2 overlap each other, the controller 180 can output a 1st object 1201-1 to an overlapping region 1200-2. According to the example shown in FIG. 12, the 1st object 1201-1 is a launch icon of a prescribed application. And, the prescribed application may include an application previously set by a user, an application launched most recently, or an application used most frequently.

Additional objects 1201-1 to 1201-5 and additional objects 1202-1 to 1202-3 can be outputted to the region 1200-1 and the region 1200-3 failing to overlap each other in the whole regions of the 1st circular indicator 1101-1 and the 2nd circular indicator 1101-2, respectively. Among the additional objects, the objects 1201-2 to 1201-5 outputted to the 1st circular indicator 1101-1 are application launch icons and the objects 1202-1 to 1202-3 outputted to the 2nd circular indicator 1101-2 are notification objects. In particular, by disposing objects of different types on the 1st circular indicator 1101-1 and the 2nd circular indicator 1101-2, respectively, it is proposed to enable a user to select a desired object easily.

Besides, a control method of switching the output of the 1st object 1201-1 to the output of the 2nd object among the additional objects shall be described later.

While the prescribed object is selected (i.e., the object is located in the overlapping region), if the touch is released, the controller 180 can launch an application or function corresponding to the corresponding object. For instance, referring to FIG. 12 (*b*), while the launch icon 1201-1 of a camera application is selected, if a touch is released, the controller 180 releases a lock of the touchscreen 151 and is also able to launch the corresponding camera application.

Meanwhile, according to one embodiment of the present disclosure, it is proposed to output an object distinguished in accordance with a touch point location of a multi-touch. According to the example shown in FIG. 12, since the touch points of the multi-touch are located in the region ① and the region ④, the application launch icon and the notification object are outputted. According to the example shown in FIG. 13, since touch points of a multi-touch are located in the region ② and the region ③, widget objects 1301-1 to 1301-3 and home screen objects 1302-1 to 1302-3 are outputted. Thus, in case that the outputted objects or the types of the objects are distinguished in accordance with a location of a touch point from which a user starts the multi-touch, it is advantageous in that the user can easily access a desired object.

The widget object may include at least one of a missed call notification widget, a message notification widget, a time guide widget, a schedule widget, a weather widget, an SNS (social network service) widget, a messenger widget, a game notification widget and the like.

While the prescribed widget object is selected (e.g., the object is located in the overlapping region), if the touch is released, the controller 180 releases a lock of the touchscreen 151 and is also able to launch a function corresponding to the widget.

Likewise, while the prescribed home screen object is selected (e.g., the object is located in the overlapping region), if the touch is released, the controller 180 releases a lock of the touchscreen 151 and is also able to output the corresponding home screen.

One example of a different object type possibly disposed on a circular indicator is described in detail with reference to FIG. 14 as follows.

Figure 14:
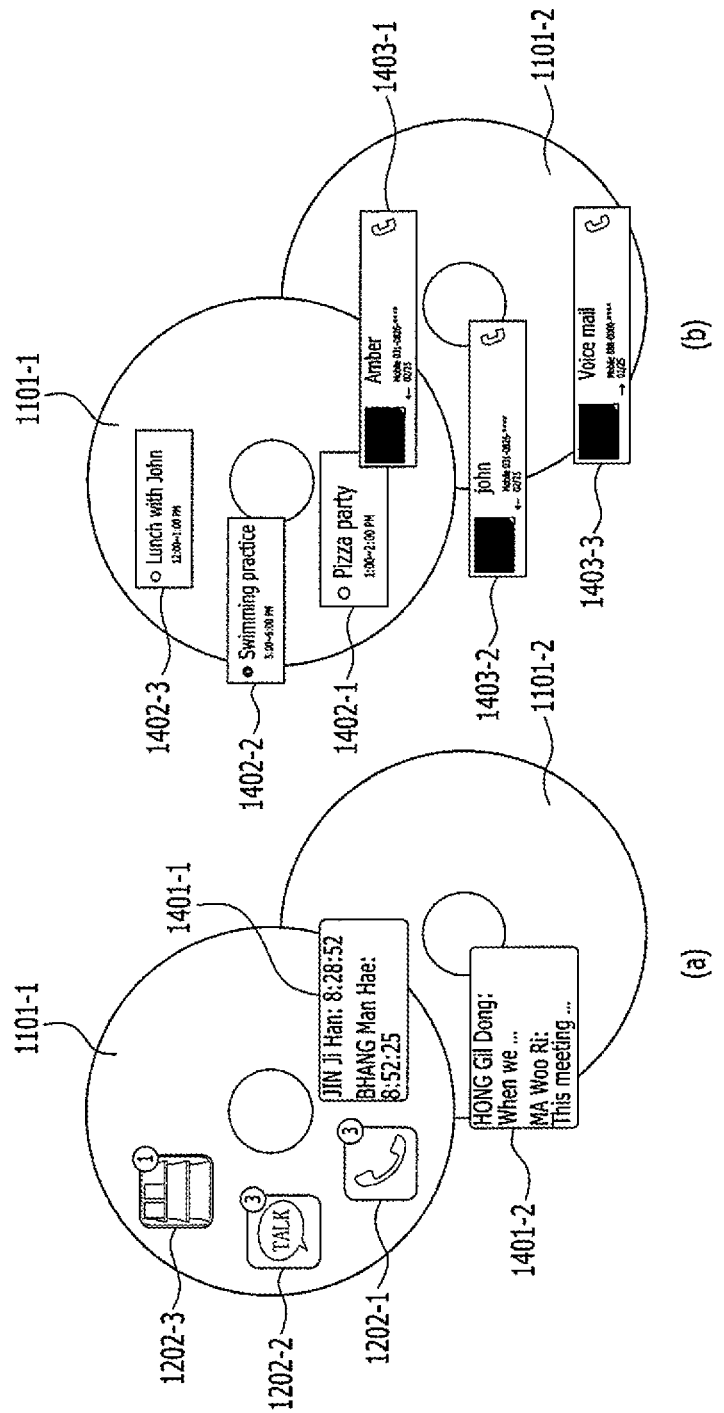
FIG. 14 is a diagram for one example of a different object type possibly disposed on a circular indicator according to one embodiment of the present disclosure.

FIG. 14 is a diagram for one example of a different object type possibly disposed on a circular indicator according to one embodiment of the present disclosure.

Referring to FIG. 14 (*a*), according to one embodiment of the present disclosure, notification objects 1202-1 to 1202-3 are currently outputted through a 1st circular indicator 1101-1. And, detailed content objects 1401-1 and 1401-2 including details of the notification are currently outputted through a 2nd circular indicator 1101-2.

While a prescribed detailed content object is selected, if a touch is released, the controller 180 releases a lock mode of the touchscreen 151 and is also able to output a screen for checking a prescribed detailed content. For instance, while the 1st detailed content object 1401-1 including a missed call list is selected, if a touch is released, the controller 180 can output a screen for checking a corresponding missed call.

Referring to FIG. 14 (*b*), according to one embodiment of the present disclosure, schedule objects 1402-1 and 1402-3 are currently outputted through a 2nd circular indicator 1101-1. And, missed call notification objects 1403-1 to 1403-3 are currently outputted through a 2nd circular indicator 1101-2.

Meanwhile, the object outputting method shown in the drawing is one example only, by which the present disclosure is non-limited.

According to one embodiment of the present disclosure, when a single object is disposed on the overlapping region 1200-2, as a lock mode of the touchscreen 151 is released, it is proposed to launch a function/application corresponding to the single object. Hence, in order for a user to launch a desired function/application, an inter-object switching control method is required. Such an embodiment is described in detail with reference to FIG. 15 and FIG. 16 as follows.

Figure 15:
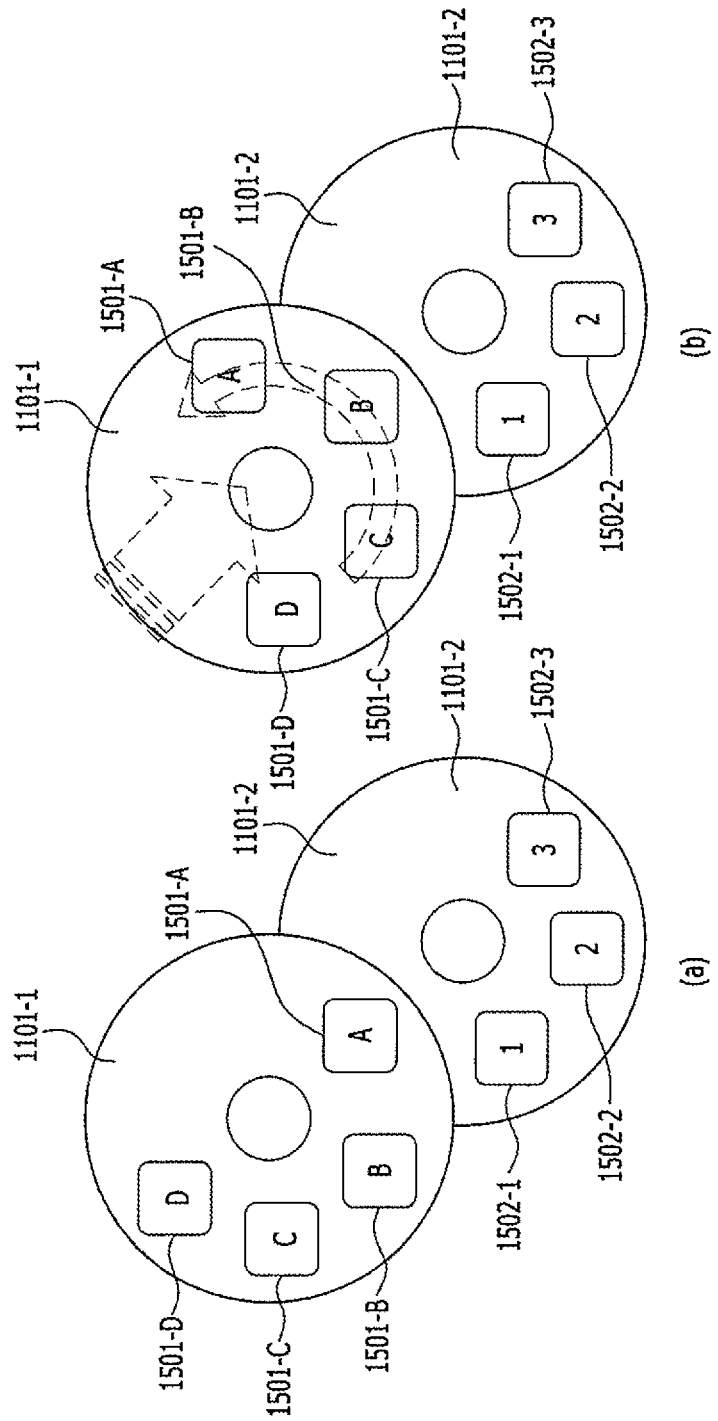
FIG. 15 and FIG. 16 are diagrams for a control method of switching an object outputted through an overlapping region to a different object according to one embodiment of the present disclosure.
Figure 16:
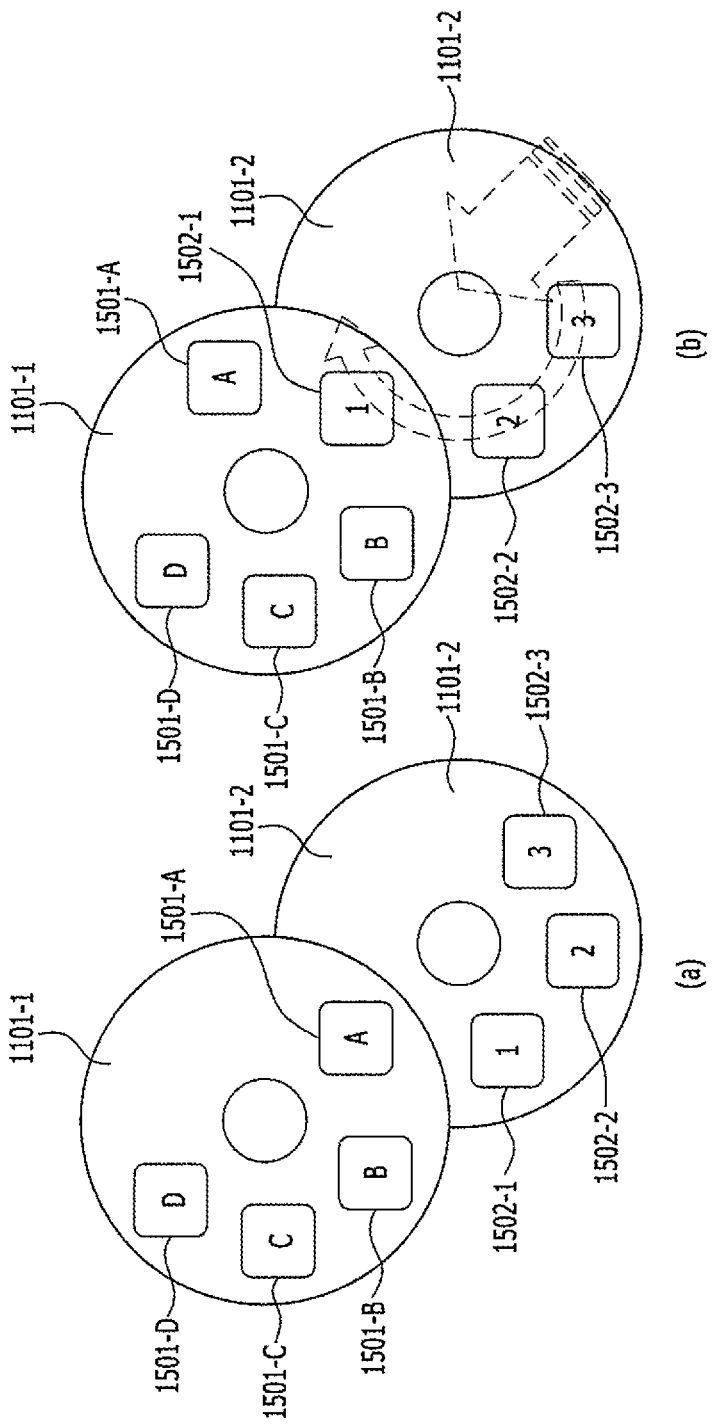

FIG. 15 and FIG. 16 are diagrams for a control method of switching an object outputted through an overlapping region to a different object according to one embodiment of the present disclosure.

According to one embodiment of the present disclosure, it is proposed to distinguish two circular indicators (e.g., a fixed circular object and a movable circular object) from each other. In particular, if a location of one of the two circular indicators is changed by a touch drag input, the location changed circular indicator can be distinguished as the movable circular indicator and the other can be distinguished as the fixed circular indicator. And, it is proposed to sequentially output objects existing in the movable circular indicator to the overlapping region 1200-2.

In particular, if one of two touch points is moved, the controller 180 can sequentially output objects, which are outputted to the circular indicator corresponding to the moved touch point, to the overlapping region 1200-2.

Referring to FIG. 15 (*a*) and FIG. 16 (*a*), an object A 1501-A to an object D 1501-D are outputted to a 1st circular indicator 1101-1. 1st to 3rd objects 1502-1 to 1502-3 are outputted to a 2nd circular indicator 1101-2.

If a touch gesture for moving the 1st circular indicator 1101-1 in a direction of the 2nd circular indicator 1101-2 is received, the controller 180 can switch the object A 1501-A outputted to the overlapping region 1200-2 to the object B 1501-B, the object C 1501-C and the object D 1501-D in sequence [FIG. 15 (*b*)].

On the other hand, if a touch gesture for moving the 2nd circular indicator 1101-2 in a direction of the 1st circular indicator 1101-1 is received, the controller 180 can switch the object A 1501-A outputted to the overlapping region 1200-2 to the 1st object 1502-1, the 2nd object 1502-2 and the 3rd object 1502-3 in sequence [FIG. 16 (*b*)].

In particular, according to the above-described embodiment, objects of different types are outputted to the 1st circular indicator 1101-1 and the 2nd circular indicator 1101-2, respectively. Hence, it is advantageous in that an object to be launched can be easily selected depending on applying a user's touch drag to a prescribed touch point.

According to the above-described embodiment, prescribed objects are outputted to the 1st circular indicator and the 2nd circular indicator all. In the following description, a control method of outputting an object to a single circular indicator only according to an embodiment is described in detail.

Figure 17:
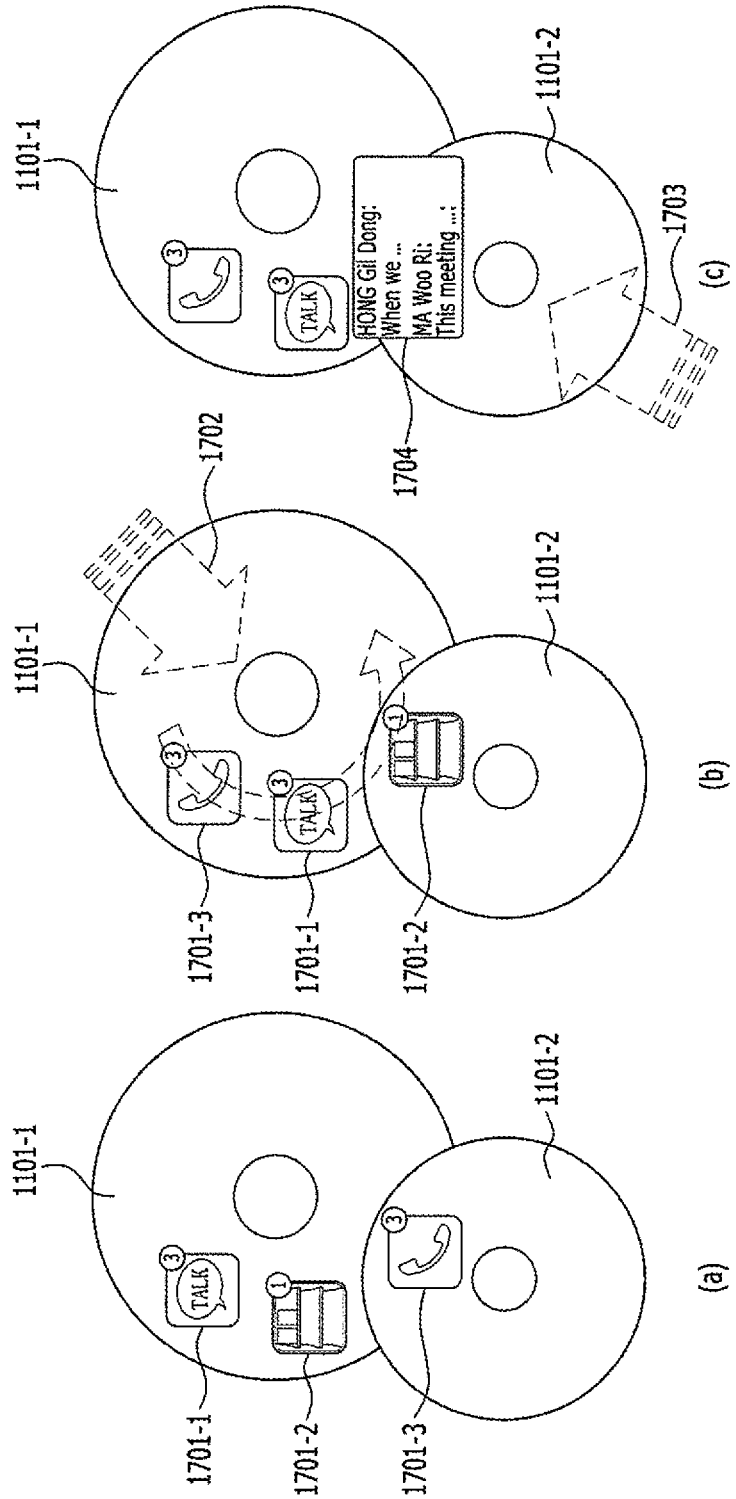
FIG. 17 is a diagram for a control method of displaying details of a prescribed object displayed on a circular indicator according to one embodiment of the present disclosure.

FIG. 17 is a diagram for a control method of displaying details of a prescribed object displayed on a circular indicator according to one embodiment of the present disclosure.

According to an embodiment related to FIG. 17, after prescribed objects have been disposed on a 1st circular indicator 1101-1, it is proposed to display details of a selected object in response to a received prescribed touch gesture.

As a control method of selecting an object is identical to the former control method described in the foregoing description, its details shall be omitted from the following description.

Referring to FIG. 17 (*a*), 1st to 3rd application launch objects 1701-1 to 1701-3 are outputted through a 1st circular indicator 1101-1. As the 1st circular indicator 1101-1 is moved in a direction of a 2nd circular indicator 1101-2, a selected object can be switched to one of the 1st to 3rd application launch objects 1701-1 to 1701-3.

According to one embodiment of the present disclosure, in response to a touch gesture for moving the 2nd circular indicator 1101-2, it is proposed to output a detailed content 1704 of the selected object. In this case, the moving direction of the 2nd circular indicator 1101-2 may include a direction of a movement in a direction for the 2nd circular indicator 1101-2 to get closer to the 1st circular indicator 1101-1.

While the detailed content is outputted, if a corresponding touch is released, the controller 180 releases a lock mode of the touchscreen 151 and is able to output a screen of the corresponding detailed content.

According to the embodiments described so far, control methods of launching a prescribed function/application as soon as releasing a lock mode using a multi-touch are described. In the following description, a method of releasing a lock with security using a multi-touch is described in detail as follows.

FIG. 18 and FIG. 19 are diagrams for a control method of releasing a lock with security using a multi-touch according to one embodiment of the present disclosure.

Referring to FIG. 18 (*a*) and FIG. 19 (*a*), a 1st circular indicator 1101-1 and a 2nd circular indicator 1101-2 are currently outputted through the touchscreen 151. In response to a touch drag input to the 2nd circular indicator 1101-2, while the 1st circular indicator 1101-1 and the 2nd circular indicator 1101-2 contact each other, if a corresponding touch is released, the controller 180 can release a lock mode of the touchscreen 151.

In response to a touch drag input to the 2nd circular indicator 1101-2, while a most outer circle 1901 of the 1st circular indicator 1101-1 and an inner circle of the 2nd circular indicator 1101-2 contact each other, if a corresponding touch is released, the controller 180 can release a lock mode of the touchscreen 151.

In particular, according to the above-described embodiment, a relative location or state between two circular indicators can be utilized as a security key for a lock release.

Accordingly, embodiments of the present disclosure provide various effects and/or features.

According to at least one of embodiments of the present disclosure, it is advantageous in launching a specific function as soon as releasing a lock screen.

According to at least one of embodiments of the present disclosure, it is advantageous in providing various lock release methods.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
    a touchscreen configured to sense touch points on the touchscreen including a first touch point and a second touch point; and
    a controller configured to output on the touchscreen a first circular indicator and a second circular indicator with reference to the first touch point and the second touch point, respectively, wherein the controller controls the touchscreen to output a first object in a region in which the first and second circular indicators overlap each other, and when a touch gesture for moving either the first touch point or the second touch point is received, a lock state of the touchscreen is released, and
    wherein when a location of one of the first touch point or the second touch point is changed, a corresponding one of the first circular indicator or the second circular indicator is moved to the changed location and is set as a movable circular indicator, and another one of the first circular indicator or the second circular indicator is set as a fixed circular indicator.

2. The mobile terminal of claim 1, wherein the controller partitions the touchscreen into a plurality of virtual regions, and wherein each of the first touch point and the second touch point are sensed in a preset one of a plurality of the virtual regions.

3. The mobile terminal of claim 1, wherein, when the touch gesture is received, the controller releases the lock state of the touchscreen and launches a function corresponding to the first object.

4. The mobile terminal of claim 1, wherein, when a first touch gesture for moving the first touch point is received, the controller switches the outputted first object to a second object, and when a second touch gesture for moving the second touch point is received, the controller switches the outputted first object to a third object.

5. The mobile terminal of claim 4, wherein the first object is an object configured to output a prescribed notification to a user and the second object is an object configured to output details of the prescribed notification.

6. A method of controlling a mobile terminal, comprising the steps of:
- sensing touch points on a touchscreen including a first touch point and a second touch point;
- outputting on the touchscreen a first circular indicator and a second circular indicator with reference to the first touch point and the second touch point, respectively;
- outputting a first object in a region in which the first and second circular indicators overlap each other; and
- when a touch gesture for moving either the first touch point or the second touch point is received, releasing a lock state of the touchscreen,
- wherein when a location of one of the first touch point or the second touch point is changed, a corresponding one of the first circular indicator or the second circular indicator is moved to the changed location and is set as a movable circular indicator, and another one of the first circular indicator or the second circular indicator is set as a fixed circular indicator.

\* \* \* \* \*